(12) United States Patent
Cox et al.

(10) Patent No.: US 7,562,227 B1
(45) Date of Patent: Jul. 14, 2009

(54) METHOD OF AUTHENTICATING A USER ON MULTIPLE DEVICES USING A PROCEDURAL MEMORY BASED PASSWORD

(75) Inventors: Aaron R. Cox, Tucson, AZ (US); Brad M. Johnson, Raleigh, NC (US); Thomas J. Sluchak, Apex, NC (US); Jeffrey J. Smith, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/053,799

(22) Filed: Mar. 24, 2008

(51) Int. Cl.
    *H04K 1/00* (2006.01)
(52) U.S. Cl. ..................................... 713/183
(58) Field of Classification Search ................ 713/183, 713/184
    See application file for complete search history.

(56) References Cited

U.S. PATENT DOCUMENTS

| | | | |
|---|---|---|---|
| 5,559,961 A * | 9/1996 | Blonder | 726/18 |
| 7,062,655 B2 * | 6/2006 | Nelson et al. | 713/183 |
| 7,124,433 B2 * | 10/2006 | Little | 726/2 |
| 2002/0109677 A1 | 8/2002 | Taylor | |
| 2003/0005338 A1 | 1/2003 | Solioz | |
| 2008/0086770 A1 * | 4/2008 | Kulkarni et al. | 726/20 |

\* cited by examiner

*Primary Examiner*—Kambiz Zand
*Assistant Examiner*—Jason K Gee
(74) *Attorney, Agent, or Firm*—Cantor Colburn LLP; Randall Bluestone

(57) ABSTRACT

A method for authenticating a user with a procedural memory based password system is provided. The procedural password system allows the use of the same password on multiple devices that have different input keyboards. The system stores the password as a sequence of relative position keystrokes. To authenticate the user, the system compares the relative positions and sequence of the keys entered by the user against those stored in a database. Since the password consists of relative positions of the entered keys, the user may use the same password on devices that have different input mechanisms.

3 Claims, 5 Drawing Sheets

METHOD OF AUTHENTICATING A USER ON MULTIPLE DEVICES USING A PROCEDURAL MEMORY BASED PASSWORD

BACKGROUND OF THE INVENTION

This invention relates to a method for authenticating a user with a password on multiple devices. In particular, the invention relates to a method for authenticating a user having a password based on procedural memory.

Computer networks are frequently subjected to undesired intrusions by third parties who do not have approval to use the network. To reduce the chance of unapproved access, security systems that authenticate the user have been developed. These systems usually require a person attempting to use the network to enter some type of password. Typically, these passwords are combination of letters and numbers are entered by the user and compared against a password stored on a server.

For a password to be effective, it needs to have a large number of characters, typically more than six, and not be composed of ordinary words or names. In general, the longer the password, the more secure it is. If the user has a password that is composed of ordinary words or names, it may be subject to attack by tools that automatically scan through words in the dictionary in an attempt to guess the password. Thus, a desired password will be long in length and composed of seemingly random letters and number. Unfortunately, this is also the type of password that most users have a difficult time remembering.

As electronic devices, such as computers, personal digital devices, cellular phones, voicemail systems and the like have proliferated, the number of passwords a person must remember has also greatly increased. Inevitably, the user needs to have a different password on each system since the input devices are different. Further, writing down the password is discouraged since the writing may be discovered. This leaves the users with the difficult task of remembering a wide variety of passwords in order to access systems on a daily basis.

While current methods for authenticating users on computer systems are suitable for their intended purposes, there exists a need for improvements in allowing users to use a same password on multiple devices having different input mechanisms.

BRIEF DESCRIPTION OF THE INVENTION

A method of authenticating a user on a network-attached device is provided. The method includes prompting a user to input a new password using a first input device with multiple input keys. The first input device includes input keys that have a first layout. The method then records the password and determines a relative position and a sequence of the first input device input keys in the new password. The relative position and sequence of the first input device input keys of the new password is stored on a network attached server as a user password. The user is then prompted for an input password using a second input device with multiple input keys. The second input device includes input keys having a second layout.

BRIEF DESCRIPTION OF THE DRAWINGS

The subject matter, which is regarded as the invention, is particularly pointed out and distinctly claimed in the claims at the conclusion of the specification. The foregoing and other objects, features, and advantages of the invention are apparent from the following detailed description taken in conjunction with the accompanying drawings in which:

The detailed description explains exemplary embodiments, together with advantages and features, by way of example with reference to the drawings.

DETAILED DESCRIPTION

Figure 1:
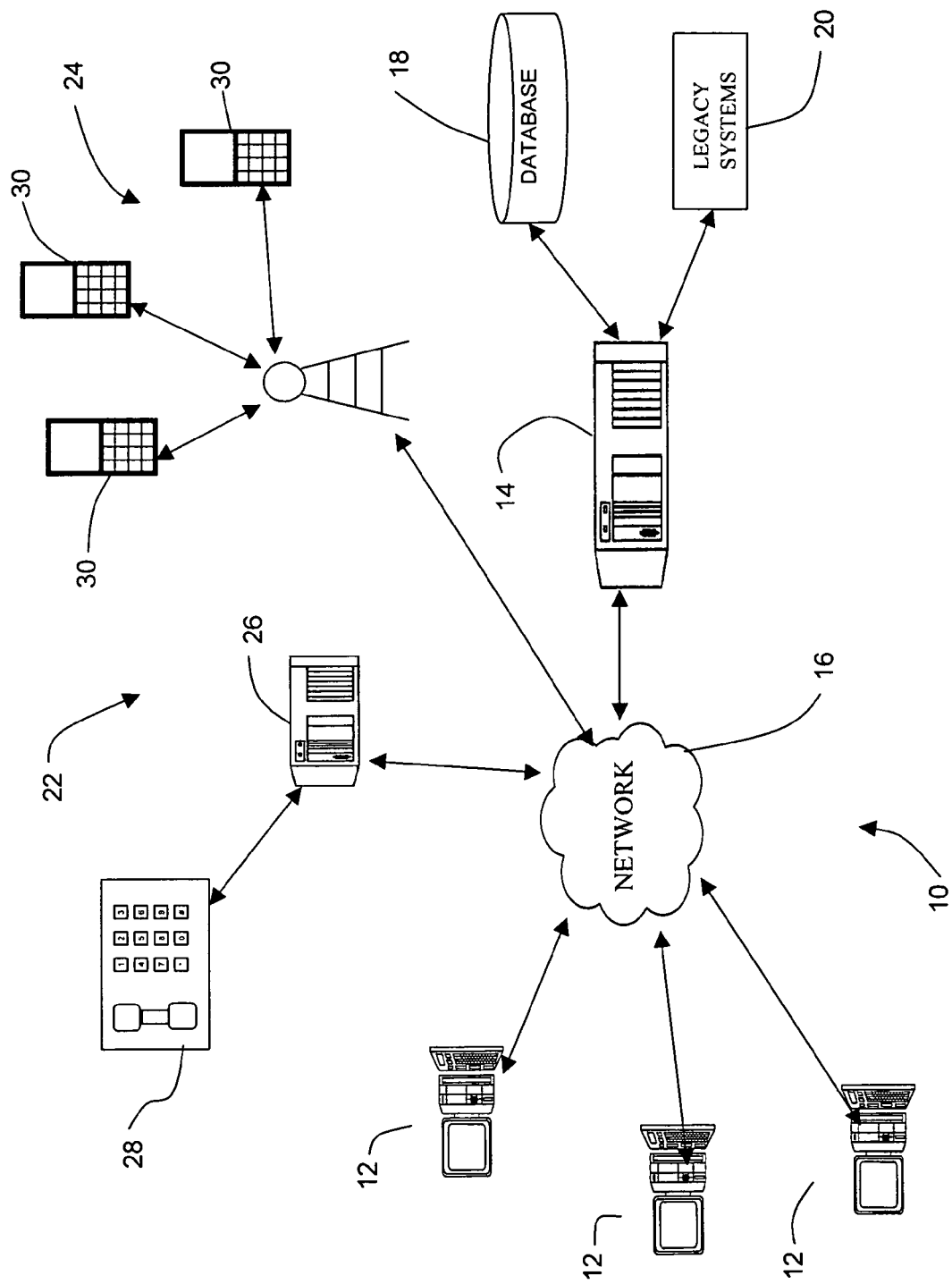
FIG. 1 illustrates a schematic diagram of a network using procedural memory based passwords according to an exemplary embodiment.

A computer network 10 capable of supporting a procedural memory based password system is illustrated in FIG. 1. The network 10 includes a plurality of end user computers 12 that connect to a network 16. The network 16 may be any suitable type of system capable of interconnecting one or more end user computers 12 with one or more servers 14. The network 16 may be but is not limited to the Internet, an intranet, an extranet, Ethernet, a local-area-network, a wide-area-network, a wireless network, an optical network or a powerline network. The network 16 may use one or more network protocols, TCP/IP for example, to allow the computers 12 to communicate with other computers 12 or servers 14. It should be appreciated that the network 16 may also include distributed-computing methodologies wherein each computer 12 is both an end user terminal and a server. The computers 12 include executable code or software applications, such as user authentication software using procedural memory based passwords, for example, that may be operated by users on the computers 12.

The computer 12 is a suitable electronic device capable of accepting data and instructions, executing the instructions to process the data, and presenting the results. Computer 12 may accept instructions through user interface, or through other means, such as but not limited to voice activation means, manually-operable selection and control means, radiated wavelength, and electronic or electrical transfer. Therefore, computer 12 can be a microprocessor, microcomputer, a minicomputer, an optical computer, a board computer, a complex instruction set computer, an ASIC (application specific integrated circuit), a reduced instruction set computer, an analog computer, a digital computer, a molecular computer, a quantum computer, a cellular computer, a superconducting computer, a supercomputer, a solid-state computer, a single-board computer, a buffered computer, a computer network, a desktop computer, a laptop computer, a personal digital assistant, a cellular phone, or a hybrid of any of the foregoing. It should be appreciated that while only three computers 12 are explicitly shown in FIG. 1, the embodiments disclosed herein are applicable to any number of computer terminals.

In the exemplary embodiment, computer 12 is a general purpose computing device in the form of a conventional computer having a processing unit (CPU), system memory and a system bus that couples various system components to the CPU. The system bus may be any of several types of bus structures including a memory bus or memory controller, a peripheral bus, and a local bus using any of a variety of bus architectures. The system memory includes read-only memory (ROM) and random access memory (RAM). The computer 12 further includes non-volatile memory, such as a hard disk or flash memory that allows repeated reading and writing of data. The nonvolatile memory may also include a magnetic drive, a removable optical disk, a CD-ROM and the like. The nonvolatile memory and its associated computer-readable media provide storage of computer readable instructions, data structures, program modules, program libraries, operating systems and other data for the computer 12.

Also connected to the network 16 are one or more servers 14 that include executable code or software applications that may be accessed by users on the computers 12. The servers 14 also include many or all of the elements described above with respect to the computer 12. The server 14 may be connected to one or more databases 18 that store information needed by the software applications running on the server 14 and computers 12. A computer database 18 is a structured collection of records or data that is stored in a computer system so that a software application or person using a query language can consult it to answer queries. The records retrieved in answer to queries are information that can be used to make decisions. The software application used to manage and query a database 18 is commonly known as a database management system (DBMS). Information included in the database 18 includes, but is not limited to, user account information, user preferences, computer IP addresses, passwords and the like. The database 18 may also include data related to the procedural memory based password, including but not limited to input device data including geometric configurations, relative position of keys in user passwords, and sequence information of user passwords. Software applications on the server 14 may retrieve and store information in the database 18 as needed to allow a user on computer 12 to be authenticated and access services provided on the network. Other devices, such as routers, switches and network nodes (not shown) may also be connected to the network 16 to facilitate communication and the flow of data.

The server 14 may also be connected to one or more legacy systems 20. The legacy systems 20 are typically proprietary software that is customized to meet the specific needs of a particular commercial enterprise. The legacy systems may include, but are not limited to, inventory systems, enterprise resource planning systems (ERP), manufacturing resource planning systems, customer relationship management (CRM), supply chain management, purchasing systems, shipping systems, accounting systems, computer aided design systems and the like. While often legacy systems 20 were not intended to connect to network 16, many commercial enterprises continue to use legacy systems 20 due to the cost and inefficiency of porting data and rules to a new-networked solution. To adapt the legacy systems 20 to operate with server 14, there may be one or more interface software applications or computer hardware (not shown) that allows commands and information to be exchanged between the server 14 and the legacy systems 20. Further, while only one server 14, database 18 and legacy system is explicitly shown in FIG. 1, the embodiments disclosed herein are applicable to any number of servers, databases and legacy systems.

Various communications systems 22, 24 may also be connected to the network 16 to access services and application software on server 14. The telephone system 22 may include a private branch exchange (PBX) or a public switched telephone network. The telephone system 22 generally includes one or more communications devices 26 that connect the telephone system 22 to the computer network 16. The communications devices 26 may be general computing devices, such as those described above with reference to computer 12, which operates specialized software for performing communications services. Communications devices 26 may also be a server, such as those described above with reference to server 14. In any case, in one embodiment, the communications device 26, is coupled to one or more end user telephones 28 and provides functionality, such as voicemail, call forwarding and the like for example.

In the exemplary embodiment, the communications system 24 is a cellular network that couples multiple devices 30 wirelessly to the computer network 16. These wireless devices may be cell phones, radio phones, satellite phone, smartphones, personal digital assistants, portable computers, laptop computers for example. In addition, the devices 30 may be any other type of device that includes computer processing circuitry that is capable of communicating with network 16.

It should be appreciated that for security purposes, before a device such as computer 12 or cell phone 30 for example, is allowed to connect to the network 16, the device and typically the user must authenticate their identity. In this way, the network 16 can determine if the device and user should be allowed to connect and to what services they should have access. Further, each of the devices 12, 14, 18, 20, 28, 30 may execute one or more application software programs, such as voicemail for example, that may require additional levels of authentication before the user is allowed to use the functionality of the software. Typically, the authentication process requires the user to enter an alpha-numeric password that is only known to the user, network 16 and/or the application software. These passwords are typically stored on a server 14 or a database 18.

It should be appreciated that each of the devices 12, 14, 18, 20, 28, 30 has different types of input devices. For example, the computer 12 may have a QWERTY style keyboard, while the telephone 28 may have a simple keypad with the numbers 0-9. Since each of the devices has a different type, layout and style of input device, prior art authentication systems required the users to have a different passwords that were capable of easily being entered on the input device. For example, the cellular phone 30 may use numbers while the computer 12 may allow a combination of numbers and alphabetic letters. Even where a single password was allowed, the different types of input devices were cumbersome and made it difficult for users to remember or enter the desired password.

Referring to FIGS. 2-5, an exemplary embodiment password system is illustrated that utilizes a procedural memory based authentication system. Procedural memory, otherwise known as "muscle memory", "implicit memory", or "unconscious memory" is a type of memory used by a person to store long term knowledge of skills or procedures. In general, procedural memory is related to knowledge of how to accomplish a task. Unlike declarative memory, which is related to the storage of facts, procedural memory may be very durable and the skill or task may be accomplished with little or only subconscious thought. Traditional prior art authentication systems relied on a person's declarative memory (e.g., memorizing an alpha-numeric password). Since declarative memory is often less than reliable, it is difficult for a person to remember the many prior art passwords needed for the various devices and systems.

Figure 2:
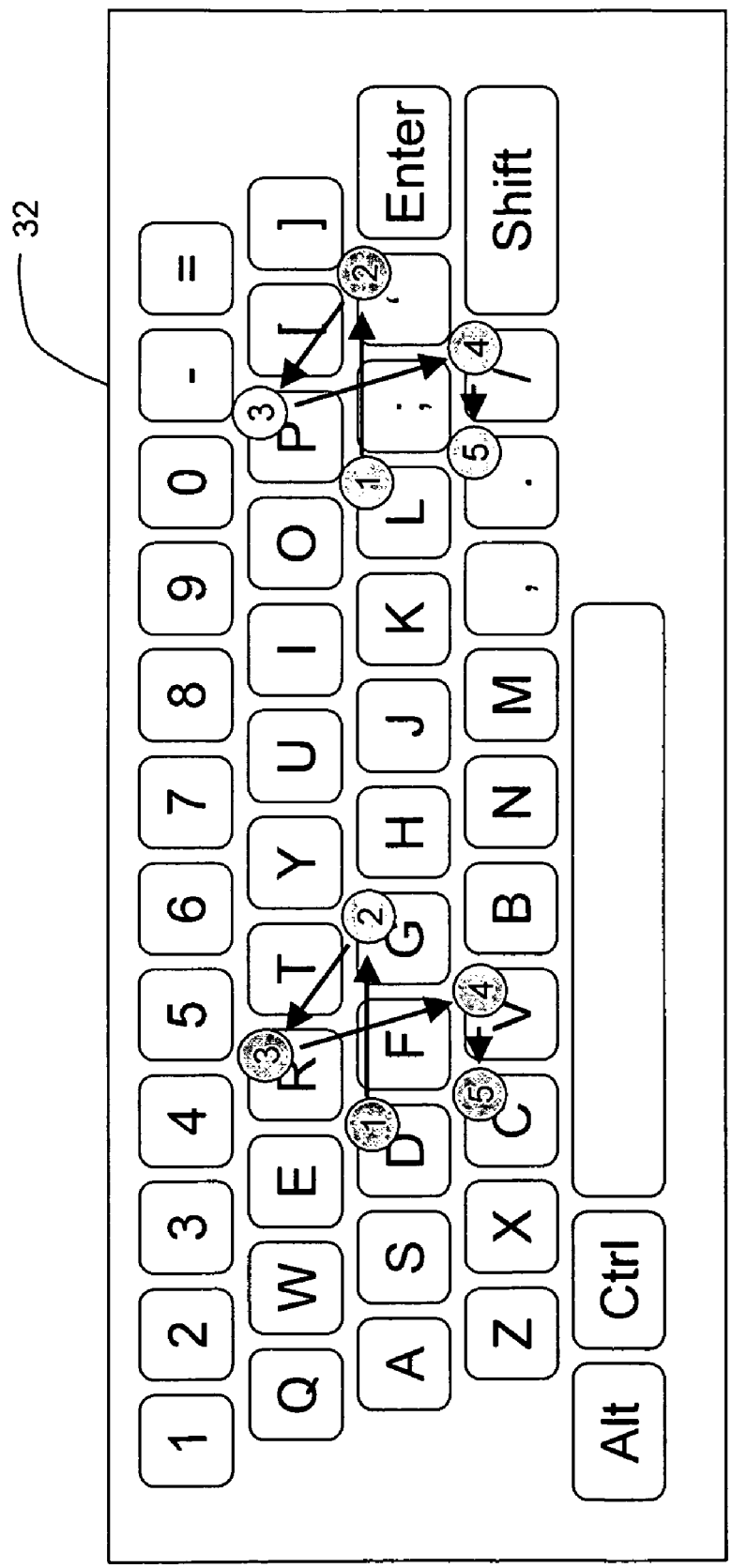
FIG. 2 illustrates an input device for a computer coupled to the network of FIG. 1.

To assist the user in remembering passwords, and for allowing the same password to be used on multiple devices having different types of input devices, the exemplary embodiment uses a procedural password instead of an alpha-numeric password. A procedural password utilizes the relative positions and the sequence of the keystrokes rather than the absolute value of the entered keys. This allows the user to only remember the motion or sequence of motions. For example, as shown in FIG. 2, a keyboard 32 coupled to a computer 12 is used to enter a password. The user enters the keys "D", "G", "R", "V", "C" for example. Rather than store the value "DGRVC" as the password, the system stores the relative position of the keys and the sequence in which they are entered. In the example used above, the system would store the following sequence:

"Initial Key"
"Two keys to the right"
"Up one row, one key to the left"
"Down two rows"
"One key to the left"

The next time the user enters the password, they could enter the sequence "DGRVC" as above, or alternatively use the same procedure on a different set of keys, such as "L", """, "P", "/", "." for example. The use of a procedure password provides a number of advantages. Since procedures are a repetitive task that is stored by the human mind in procedural memory, it is easier for the user to remember the password. Further, it also provides an additional level of security since the user does not have to enter the same password each time, but rather may use a different set of keys each time. Additionally, the use of a procedure password allows the use of the same password, even on devices with different types of input devices.

Figure 3:
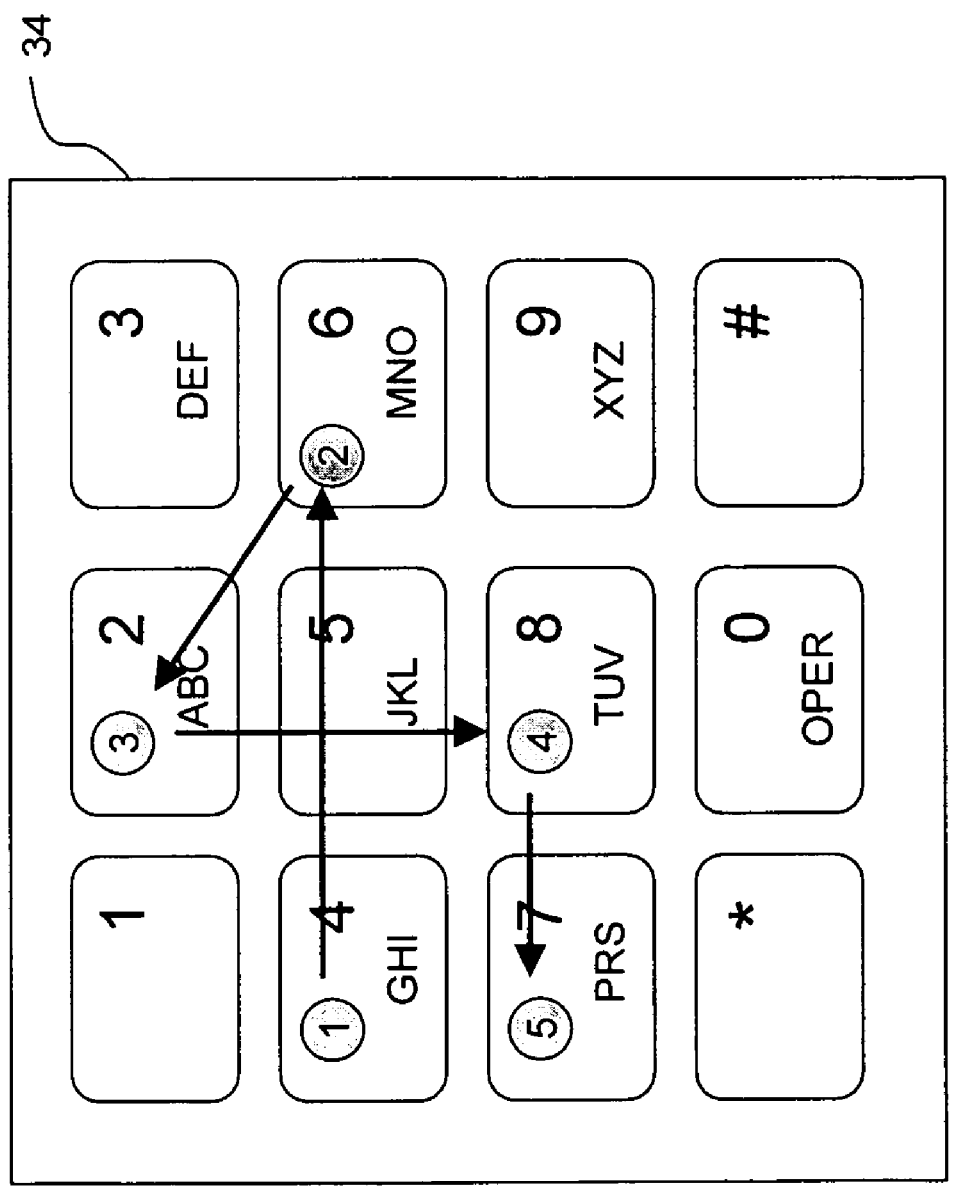
FIG. 3 illustrates an input device for a telephone coupled to the network of FIG. 1.

A standard telephone keypad 34 is illustrated in FIG. 3. Using the procedure password, the user need only enter the same sequence of relative keys. In the example above, the procedure password sequence of: "Initial Key"; "Two keys to the right"; "Up one row, one key to the left"; "Down two rows"; "One key to the left" would translate on the telephone keypad into the number "46287". It should be appreciated that this is easier for a user to use and remember rather than trying to type out the alpha-numeric password using the letters associated with the keys on the number pad.

Figure 4:
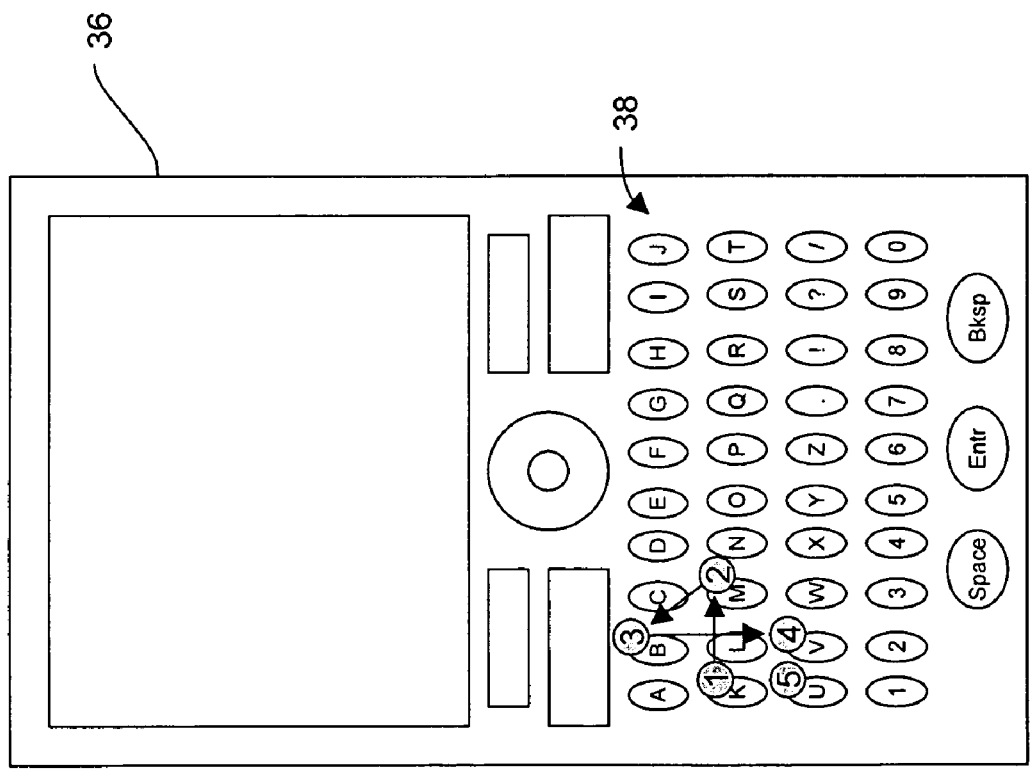
FIG. 4 illustrates an input device for a mobile phone coupled to the network of FIG. 1; and, FIG. 5 illustrates a flow diagram for the operation of an exemplary embodiment procedural memory based password method.

A further example of device, such as a smartphone 36, is illustrated in FIG. 4. Cellular phones and personal digital devices may have a wide variety of input devices, ranging from a QWERTY keyboard, an alphabetic keyboard 38 to a touchpad for example. Since the procedural password is independent of the input device, the same password, such as the example above, may be easily used. With the smartphone 36, the user may enter "K", "M", "B", "V", "U", which on the keyboard 38 provides the same relative motion and sequence as that on the QWERTY keyboard 32. It should be appreciated that the input devices 32, 34, 38 illustrated in FIGS. 2-4 are exemplary only and the procedural password may be utilized on any input device. Further, it should also be appreciated that more than one input devices 32, 34, 38 illustrated in FIGS. 2-4 may be incorporated into some devices 30. For example, a cellular phone may have a touch screen with a virtual keyboard, a number keypad, and a slide-out QWERTY style keyboard. It should be appreciated that the exemplary embodiment for the procedural password may be utilized on any such devices 30 utilizing multiple input devices 32, 34, 38.

Figure 5:
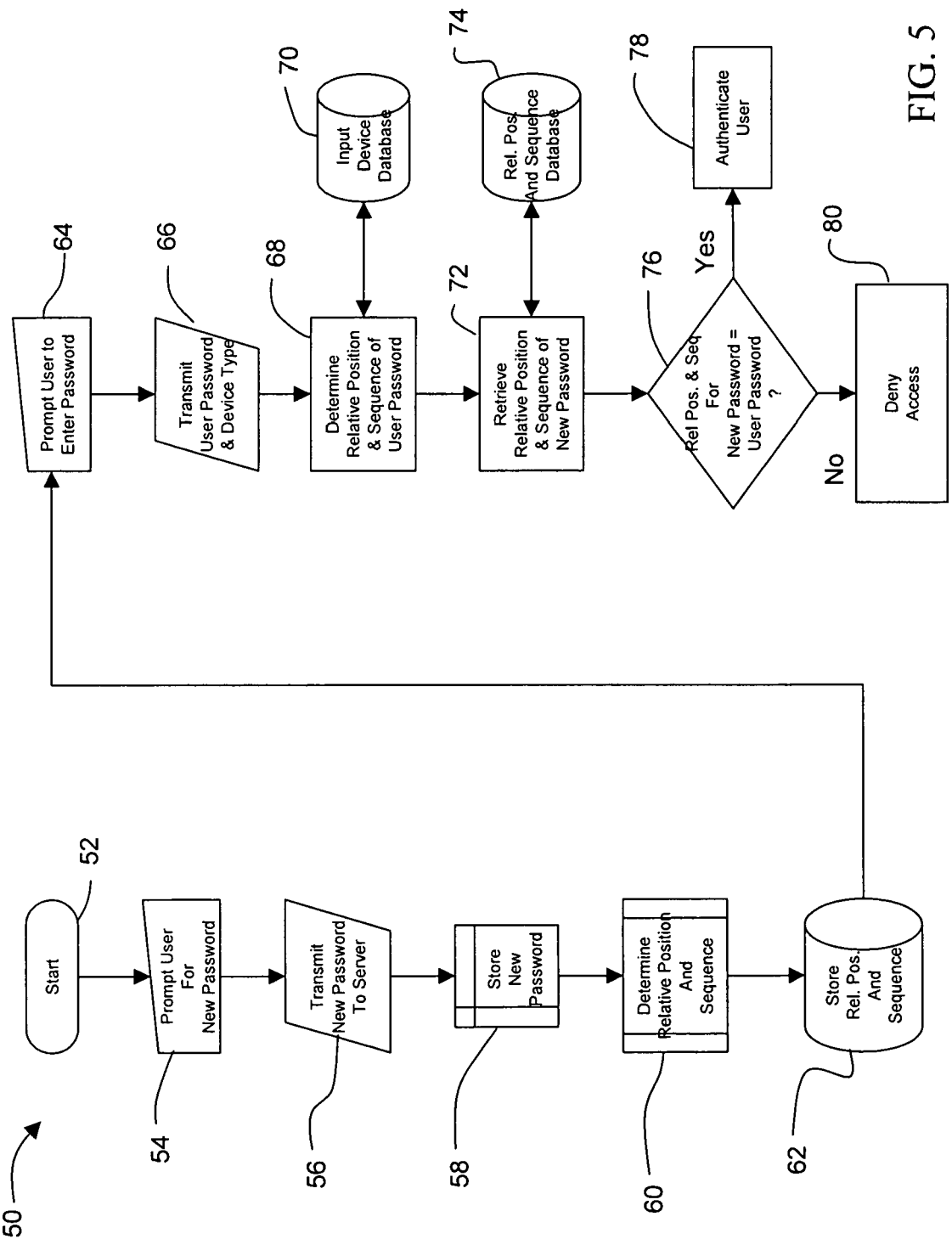

A flow diagram illustrating the exemplary embodiment procedural memory based password process 50 is shown in FIG. 5. In this diagram, the user starts the process by setting up a new password in block 52. The user is prompted by the process 50 to enter their new password in block 54. The new password and input device type are transmitted to server 14 in block 56. It should be appreciated that the input device type may alternatively be known by the process 50 as part of the initiation of communication protocol between the user's device and the network 16 for example. In this alternate embodiment, the input device type would not need to be transmitted. The process 50 stores the new password in block 58 and then determines the relative position of the entered password keys and the sequence in which the keys were entered in block 60. The procedural password, which consists of the relative motions and sequences of the keystrokes, is then stored in block 62. The procedural password may be stored on the server 14 or in database 18 for example.

Subsequently, when the user attempts to connect to the network, or use a service or application that requires authentication, the process 50 will prompt the user to enter a password in block 64. The entered keystrokes, and alternatively the input device type, are transmitted to server 14. Using the input device type, the server queries an input device database in block 70. The input device database includes information on the geometric arrangement of the input device on which the user is entering the password. With this information, the server 14 may determine the relative positions of the keys entered by the user. The process 50 then proceeds to block 72 where the relative positions and sequences of the entered password are compared against the stored procedural password from block 74. If process 50 determines in decision block 76 that the passwords match, the user is authenticated in block 78. If decision block 76 returns a negative, the process 50 denies access to the user in block 80.

The process 50 may also include additional steps, such as prompting for an optional simple password, such as a personal identification number or "pin number" for example. By combining the procedural password with a pin number, the level of security may be greatly increased. Alternatively, the procedural password may be combined with other types of security information such as fingerprints or biometric information.

A system that uses a procedural memory based password has a number of advantages. A procedural password reduces the possibility that a user may write down their password since procedural memory is more durable than declarative memory. The system would also be advantageous for individuals who are blind or visually impaired since the initial key that starts the sequence is irrelevant. The procedural password also allows the password to be entered in total darkness where the user cannot see the input device. Finally, since procedural passwords are easier to remember, it would encourage users to utilize longer passwords that are more secure.

The capabilities of the embodiments disclosed herein can be implemented in software, firmware, hardware or some combination thereof. As one example, one or more aspects of the embodiments disclosed can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the disclosed embodiments can be provided.

The diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While exemplary embodiments have been described, it will be understood that those skilled in the art, both now and in the future, may make various improvements and enhancements which fall within the scope of the claims which follow. These claims should be construed to maintain the proper protection for the invention first described.

What is claimed is:

1. A method of authenticating a user on a network attached device, said method comprising:

prompting a user to input a new password using a first input device via a physical keyboard with multiple input keys, wherein said first input device input keys have a first layout;

entering the new password;

recording said password;

determining a relative position and a sequence of said first input device input keys in said new password;

storing said relative position and sequence of said first input device input keys of said new password on a network attached server as a user password;

prompting said user for a first input password using a second input device via a physical keyboard with multiple input keys, where said second input device input keys have a second layout, wherein said first input device input key first layout is different from said second input device input key second layout;

entering the first input password;

transmitting said first input password and data regarding said second input device input keys second layout to said network attached server;

determining a relative position and sequence of said second input device input keys for said first input password on said server;

comparing said relative position and sequence of said second input device input keys for said first input password to said stored relative position and sequence of said first input device input keys for said user password; and authenticating said user if said relative position and sequence of said second input device input keys for said first input password and said stored relative position and sequence of said first input device input keys for said user password match.

2. The method of claim 1 further comprising:

prompting said user for a second input password using said second input device;

entering said second input password, wherein said second input password has the same relative position and sequence as said first input password using different input keys on said second input device;

transmitting said second input password and data regarding said second input device input keys second layout to said network attached server;

determining a relative position and sequence of said second input device input keys for said second input password on said server;

comparing said relative position and sequence of said second input device input keys for said second input password to said stored relative position and sequence of said first input device input keys for said user password; and, authenticating said user if said relative position and sequence of said second input device input keys for said second input password and said stored relative position and sequence of said first input device input keys for said user password match.

3. The method of claim 1 further comprising the step of prompting said user for a personal identification number after prompting for said password.

\* \* \* \* \*